(12) United States Patent
Rice et al.

(10) Patent No.: US 7,986,953 B2
(45) Date of Patent: Jul. 26, 2011

(54) LOCATION DETERMINATION WITH GEOGRAPHIC AND BIAS TUNING

(75) Inventors: Christopher R. Rice, Monroe, WA (US); Aravind Krishnamachari Seshadri, Redmond, WA (US); Timothy Sharpe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 271 days.

(21) Appl. No.: 12/475,987

(22) Filed: Jun. 1, 2009

(65) Prior Publication Data

US 2010/0304755 A1    Dec. 2, 2010

(51) Int. Cl.
*H04W 24/00* (2009.01)

(52) U.S. Cl. .............. 455/456.1; 455/456.5; 455/456.6

(58) Field of Classification Search .................. None
See application file for complete search history.

(56) References Cited

U.S. PATENT DOCUMENTS

| | | | |
|---|---|---|---|
| 5,739,785 A | 4/1998 | Allison et al. | |
| 5,986,604 A | 11/1999 | Nichols et al. | |
| 6,016,118 A | 1/2000 | Jackson et al. | |
| 6,246,361 B1* | 6/2001 | Weill et al. | 342/357.57 |
| 6,408,246 B1 | 6/2002 | Fox | |
| 6,756,940 B2 | 6/2004 | Oh et al. | |
| 6,947,734 B1 | 9/2005 | Toubassi | |
| 7,151,939 B2 | 12/2006 | Sheynblat | |
| 7,412,248 B2 | 8/2008 | McNew et al. | |
| 2005/0255855 A1* | 11/2005 | Spirito et al. | 455/456.1 |
| 2005/0255865 A1* | 11/2005 | Sillasto et al. | 455/456.5 |
| 2005/0267677 A1* | 12/2005 | Poykko et al. | 701/207 |
| 2006/0212259 A1 | 9/2006 | Seibert | |
| 2007/0093257 A1 | 4/2007 | McDougall et al. | |
| 2010/0144366 A1* | 6/2010 | Ishii et al. | 455/456.1 |

* cited by examiner

*Primary Examiner* — Ajit Patel (74) *Attorney, Agent, or Firm* — Alleman Hall McCoy Russell & Tuttle LLP (57) ABSTRACT

A method for determining location of an observer device is disclosed. The method includes receiving basestation distance data for the observer device and applying a location algorithm to the basestation distance data to determine a computed location of the observer device. The method further includes determining whether the basestation distance data correlates to any of a plurality of observer device conditions. Upon determining the basestation data correlates with one of the observer device conditions, a location bias associated with that observer device condition is employed to correct the computed location of the observer device and produce a corrected location.

20 Claims, 4 Drawing Sheets

LOCATION DETERMINATION WITH GEOGRAPHIC AND BIAS TUNING

BACKGROUND

A variety of systems exist for determining the location of an electronic device. In one type of system, the location of a device is computed based on detected distances between the device and various known locations. The distances are applied as inputs to a location-computing algorithm, which outputs a computed location of the device, relative to the known locations.

A large number of variables are present in the type of system described above. Different algorithms can be applied to arrive at the computed location. The device whose location is being determined may be equipped with a variety of different technologies, and/or the distances between the device and the reference locations may be detected using various methods. The surrounding environment may have varying characteristics—dense urban, rural, mountainous, etc. These are but a few examples of the various factors that can affect performance of a location-determining system. These considerations can make it challenging to obtain acceptable performance from a location-determining system.

SUMMARY

Accordingly, the present disclosure provides a method for determining location of an observer device. The method includes receiving basestation distance data for the device which includes identification of one or more basestations and information indicating a distance between the observer device and each of the basestations. A location algorithm is applied to the basestation distance data to calculate a computed location of the observer device. If the basestation distance data correlates with any of a plurality of observer device conditions, then the computed location is corrected with a location bias that is associated with the identified observer device condition. In some embodiments, the location algorithm is an optimal algorithm associated with a particular geographic region that correlates with the basestation distance data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
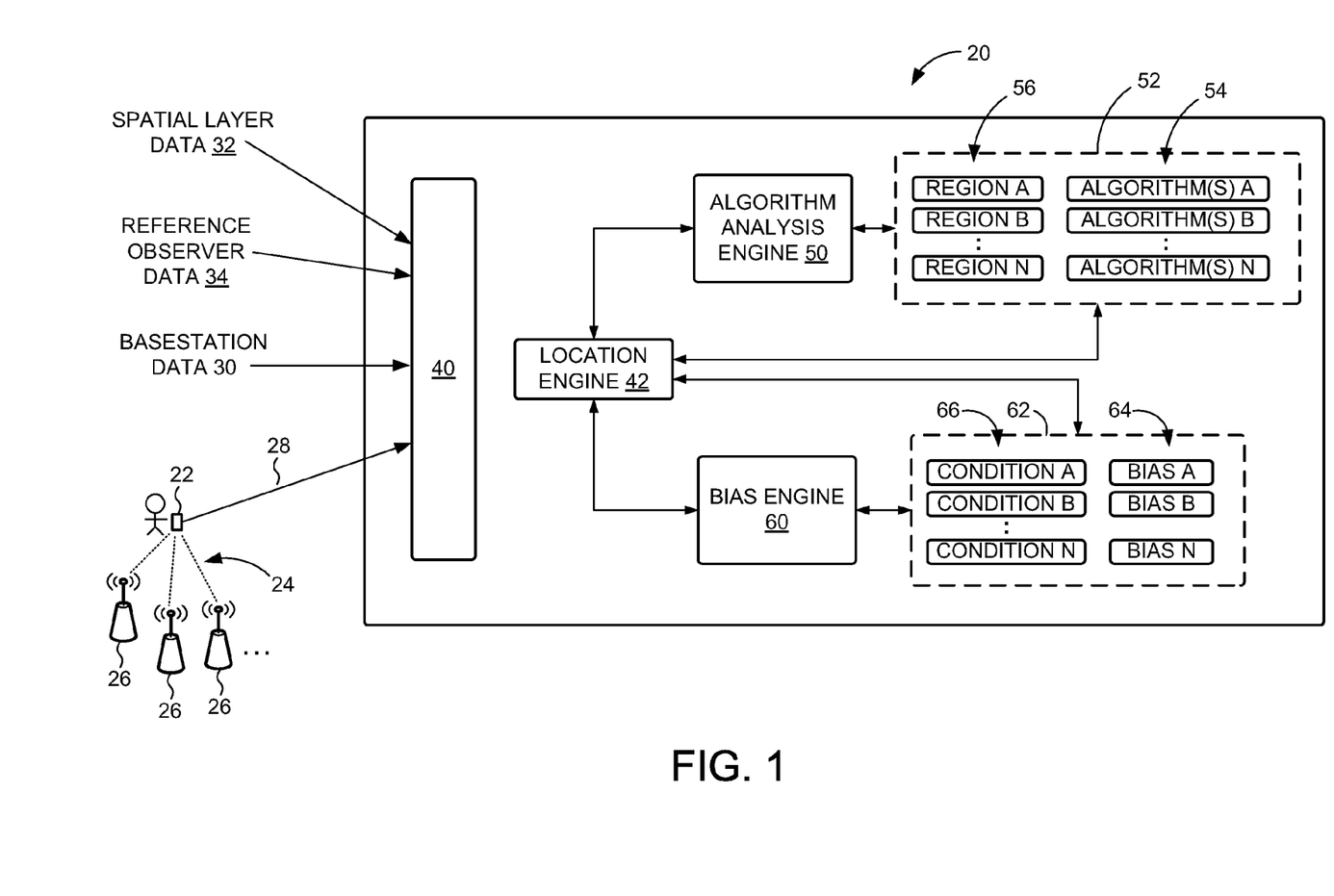
FIG. 1 schematically depicts an exemplary system for determining location of observer devices.

FIG. 1 schematically depicts a system 20 for determining the location of observer devices, such as observer device 22. Observer device 22 typically is some form of portable computing device, such as a mobile phone, personal digital assistant, portable media player, smart phone, laptop computer, etc., though the device may take other forms. Regardless of the particular configuration of the device, it is capable of receiving signals 24 (e.g., radio-frequency signals) from one or more basestations 26 that may be used to discern the location of the device. The terms "observe," "observation," "observer," etc. will be used herein in reference to a device "seeing" a basestation, in the sense that the device is within range of the basestation and/or capable of receiving a transmitted signal from the basestation.

Basestations 26 may be of various types. A basestation may be a wireless access point, a mobile phone or cell tower, an RFID transmitter, a Bluetooth transmitter, or an FM radio station, to name but a few examples. The basestations emit signals that may be used for various purposes, such as to enable a device to gain access to a telecommunications network. In addition, the signals received at an observer device (e.g., observer device 22) may be used to determine the location of the observer device. As will be explained in more detail below, the location determination typically is performed based on detected distances between the observer device and each of a number of observable basestations (e.g., basestations for which the device is receiving a signal).

Continuing with FIG. 1, observer device 22 is configured to transmit basestation distance data 28 to system 20. As will be explained in detail below, in order to provide the described location-determining functionality, system 20 may receive various other types of information, including basestation data 30, spatial layer data 32, and reference observer data 34. As indicated, system 20 may include a communications module 40 for receiving the various system inputs. In some example embodiments, communications module 40 also provides output, such as to report a computed location or provide other information to observer device 22. Communications module 40 may be operatively connected with various other components of system 20, as will be explained.

Basestation distance data 28 received at system 20 may be used to determine a computed location of a device. Typically, the basestation distance data for an observer device includes an identification of each basestation observed by the device, and other information indicative of a distance between the observer device and each observed basestation. The distance-related information may include anything usable to infer, approximate, calculate, etc. the distance between the observer device and the basestation. Non-limiting examples of such information include time-of-arrival data, observed signal strength of the basestation, signal intensity, etc. Referring more particularly to observer device 22, basestation distance data 28 could specify or be used to discern the following, for example:

| Basestation Observed | Distance from Observer Device |
|---|---|
| "Basestation A" | 10 meters |
| "Basestation B" | 400 meters |
| "Basestation C" | 80 meters |
| Etc. | Etc. |

In addition to the basestation distance data, system 20 typically has the benefit of knowing other information, such as basestation data 30, about observable basestations. For a given basestation, this other information may include location of the basestation, basestation type, an identifier code for the basestation, etc.

Continuing with FIG. 1, system 20 may also include a location engine 42 configured to generate a computed location of an observer device using basestation distance data reported to system 20 from the observer device. To perform the computation, location engine 42 may apply a location algorithm to the basestation distance data. Suitable algorithm types include convex hull, arithmetic mean (simple, weighted, etc.), transitive-closure, and bi-connected component algorithms, to name but a few examples.

Regardless of the algorithm employed, the output will include a computed location of the device. The computed location may be relative to the basestations that were observed by the device and reflected in the basestation distance data. In many cases, basestation locations are known in advance, to some acceptable degree of certainty, and the computed location of the device may then be expressed in a more global frame of reference, such as a latitude and longitude on the earth. In addition, the computed location may include elevation (altitude).

In addition to the computed location, the output from location engine 42 may also include a description of the error associated with the location calculation. For example, it may be known that when applying a particular algorithm to particular basestation data, the result will have an error of known magnitude. Furthermore, when locations are computed in three dimensions (e.g., latitude, longitude and elevation), the error may be expressed as a six-dimensional ellipsoid having known dimensions. Additionally, or alternatively, an error of uncertainly polygon may be expressed when resolving location in two dimensions.

Location engine 42 may store and/or report other information pertaining to distance calculations. For example, the amount of time to calculate a location may be stored. Observation times and other information may be retained for sets of observations, for example when multiple different observer devices provide basestation distance data for similar basestations. These are but examples—a wide variety of inputs, outputs and other parameters may be retained by location engine 42, and/or provided to other system components. As will be explained in connection with subsequent examples, this information may be employed in various ways to tune the operation of location engine 42.

The operation of location engine 42 may be tuned via operation of one or both an algorithm analysis engine 50 and a bias engine 60 of system 20. As will be explained in more detail below, algorithm analysis engine 50 is configured to determine an optimal algorithm or algorithms to be used when calculating locations in particular geographic regions. Algorithm analysis engine 50 may reach this determination over time, by analyzing performance of a variety of different algorithms for various different geographic regions. Moreover, the determination of optimal algorithms may be dynamically and repeatedly updated as analysis is performed for a given geographic region or regions. As shown in the figure, a regional algorithm store 52 may be provided, in which an optimal algorithm or algorithms 54 are associated with specific geographic regions 56. For example, algorithm (s) A are identified as the optimal algorithm(s) associated with region A; algorithms(s) B are the optimal algorithm(s) for region B; etc. Store 52 may be assembled and repeatedly updated over time, in order to dynamically update optimal algorithms for each region. Accordingly, when it is determined that location engine 42 is being requested to determine a location in a particular geographic region, the relevant optimal algorithm for the geographic region may be retrieved from algorithm store 52.

Bias engine 60, on the other hand, is configured to build a store 62 of location biases 64 that are associated with various observer device conditions 66. In particular, store 62 includes a location bias A which is associated with observer device condition A; a location bias B is associated with observer device condition B; etc. A given location bias may be a vector or other mechanism that corrects a computed location that is initially computed by a location algorithm. For example, it may be determined empirically that when a particular set of basestations is observed by an observer device at certain distance ranges (observer device condition), the computed location is off by a known amount.

Often, a magnitude and direction of the error may be known as well, and the location bias may be implemented as a vector that corrects the error. When similar observations are made subsequently (e.g., by other observer devices), the error may be corrected using the vector or other empirically-determined location bias. As with the optimal algorithms determined by algorithm analysis engine 50, the location biases 64 may be continuously generated and updated by bias engine 60. Accordingly, when location engine 42 is requested to compute location in a circumstance corresponding to one of the observer device conditions in store 62, the respective location bias 64 may be employed to correct the computed location.

Figure 2:
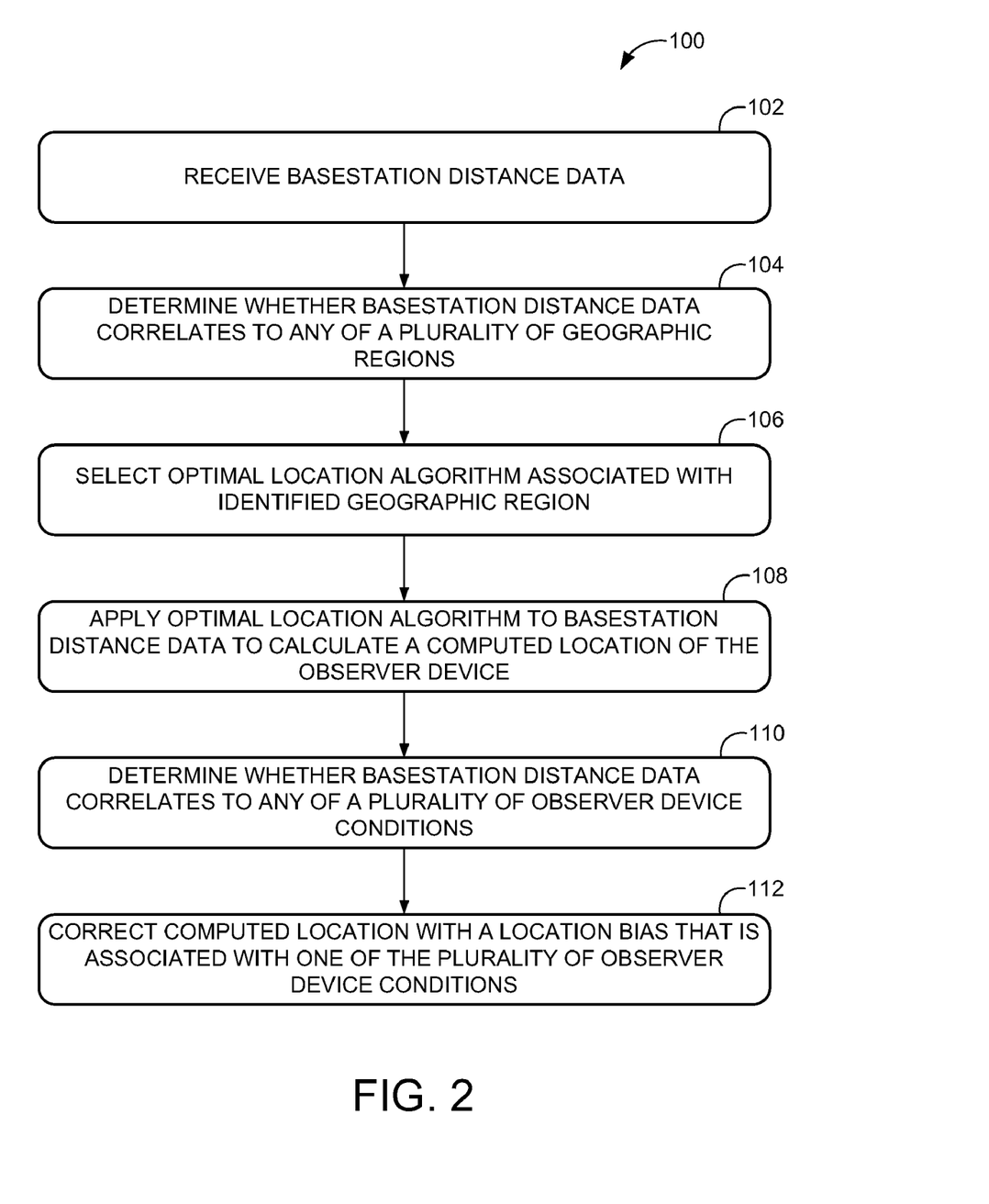
FIG. 2 is a flowchart depicting an example method for determining location of an observer device.

Referring now to FIG. 2, the figure shows an example method 100 for determining location of an observer device. Various references will be made to the example system of FIG. 1, though it will be appreciated that the method may be carried out using other components. At 102, the method includes receiving basestation distance data for the observer device. As in the examples discussed above, the basestation distance data will include identification of one or more basestations. For each observed basestation, the basestation distance data will also include information indicating a distance between the observer device and the respective basestation.

To compute a location for the observer device, a location algorithm is applied to the basestation distance data. In some cases, it will be desirable to employ an algorithm particularly suited to the geographic region in which the observer device is located. Accordingly, as shown at step 104, method 100 may include determining whether the basestation distance data received for the observer device correlates to any of a plurality of geographic regions. This may be performed in a variety of ways. In one example, system 20 (FIG. 1) has pre-existing knowledge of basestation locations. Therefore, based on the set of basestations that are included in the basestation distance data reported by an observer device, an assumption can be made about the geographic region in which the device is located. In any case, once the geographic region is determined, an optimal location algorithm or algorithms associated with the geographic region may be selected, as shown at step 106. Step 104 and step 106 may be performed via combined and/or individual operation of location engine 42 and algorithm analysis engine 50, or with other suitable components/systems.

Continuing now with step 108 of FIG. 2, the location algorithm is applied to calculate a computed location for the observer device. This may be a generally-applied or default algorithm, though it will often be an optimal algorithm specifically associated with the geographic region, as described in connection with steps 104 and 106.

Step 110 and step 112 involve determining whether circumstances exist that call for a specific correction to be applied to increase the accuracy of the computed location of the observer device. Specifically, at step 110, the method may include determining whether the basestation distance data correlates to any of a plurality of observer device conditions. If such a correlation exists, the location bias that is associated with the observer device condition is retrieved, and is used to apply a correction to the computed location of the observer device. In particular, at step 112, the method includes correcting the computed location (i.e., the location computed at step 108) with a location bias that is associated with one of the plurality of observer device conditions.

Figure 3:
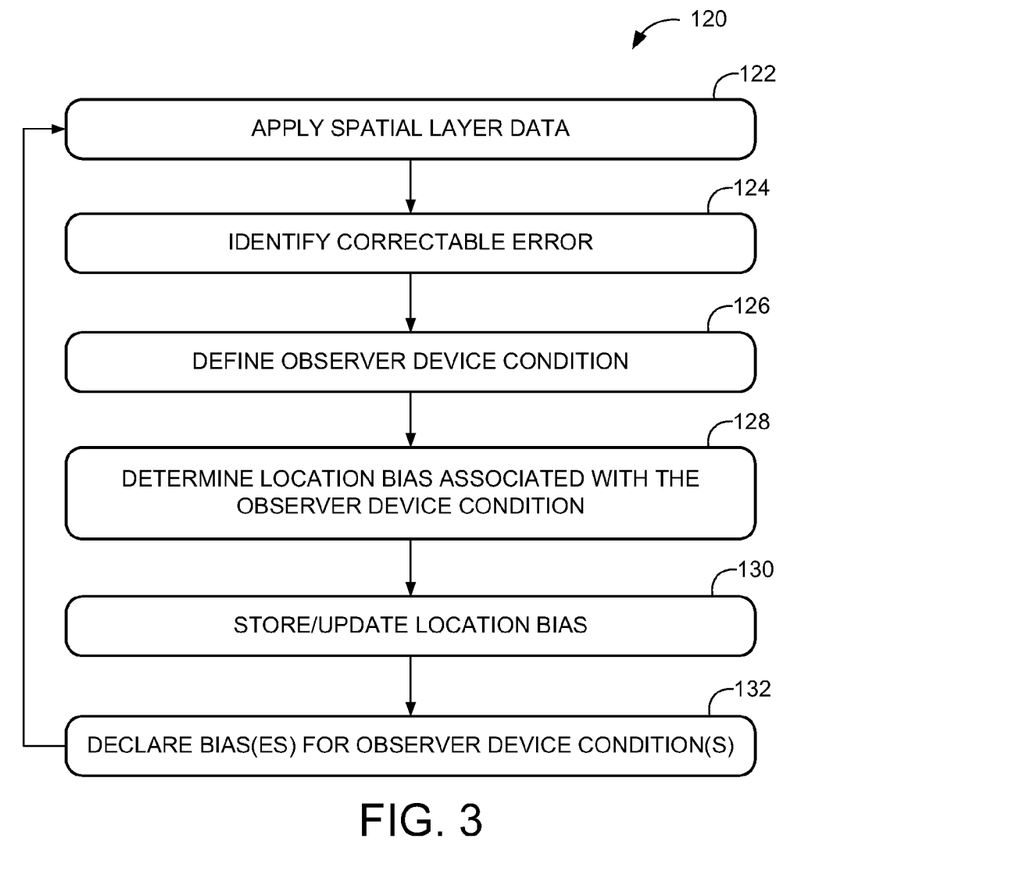
FIG. 3 is a flowchart depicting an example method for determining location biases that are usable to adjust output of location-determining algorithms.

Referring now to FIG. 3, an example method 120 will be described for determining and using location biases to provide corrections and improve accuracy of a location determination system. Various references will be made to FIG. 1, and particularly to bias engine 60, though it should be appreciated that the example method may be implemented in connection with other systems and components.

At 122, the method may include applying spatial layer data to a location determination system. For example, in FIG. 1, spatial layer data 32 may be applied to system 20. The spatial layer data may include various types of information that can be layered onto or otherwise incorporated with a locational frame of reference. The spatial layer data can include, for example, topography, weather data, mapping data with representations of streets, buildings, etc. in the vicinity of a location to be computed. As will be described, this data can be employed to identify situations in which a location bias could be used, and/or to help determine (e.g., quantify) a specific location bias that will be used in a particular situation.

Continuing with method 120, at step 124 the method may include identifying a correctable error; at step 126 the method may include defining an observer device condition associated with the correctable error; and at step 128 the method may include determining a location bias associated with the observer device condition that may be used to adjusted computed locations so as to account for the error.

The above steps may be understood more clearly with reference to various examples. In a first example, an observer device reports seeing a specific set of basestations at specific distances. From that data, a computed location for the observer device is generated using a location algorithm. Assume, however, that the same basestations were observed at roughly the same distances previously by a reference observer having a declared location known to be acceptably accurate. FIG. 1 depicts reference observer data 34, which may include information from such a reference observer. The trusted reference nature of the information from the reference observer may arise in various ways. In one example, the reference observer may have location-determining capabilities, such as provided via a satellite-based system, that are known to be accurate or are otherwise trusted by system 20. In another example, a reference observer may declare a location based on a known landmark, such as a particular street corner. These are nonlimiting examples; a variety of other types of reference information may be received and used to define and quantify correctable errors that may arise during the application of location algorithms.

In any event, if the computed location of the observer device in the above example were appreciably different from the declared location of the reference observer, that could constitute a correctable error (step 124). Continuing with this example, defining the observer device condition might include specifying that the to-be-determined correction is applicable when the same basestations are observed, and when the observed distances are within a defined percentage or other range of those reported by the observer device. Determining the location bias would include calculating a vector with a magnitude and direction sufficient to correct the computed location of the observer device to coincide with the declared location of the reference observer.

In another example, assume that spatial layer data (e.g., spatial layer data 32 of FIG. 1) has been incorporated into the system frame of reference, including layer data with a particular building. Assume further that various reference observations (e.g., via reference observer data 34) have been reported in the past concerning a wireless access point known to be inside the building. Based on this accumulated data, it could be assumed that if a subsequent observer reports a signal from the wireless access point with a certain signal strength or greater, then the observer must be in the building. Accordingly, if an algorithm were to yield a computed location outside of the building, the location bias would cause the corrected location to "snap" to, or be co-located with, the building represented in the spatial building layer. A similar correction could also be applied using a street or other type of item represented in a map layer.

In another example, spatial weather data may be employed to generate a bias correction for tuning location determination. In particular, weather data may be known and recorded for a time that is contemporaneous with a particular instance of basestation data reported by an observer device. Because temperature can have different propagation effects on radio-frequency signals of different frequencies, an adjustment in the form of a location bias could be employed in this situation to correct the output of a given location algorithm for a particular set of basestations.

In still another example, topography may be employed to identify and correct errors. Assume first that a given location algorithm has calculated a computed location for an observer device based on a set of observed basestations. Assume further, however, that the overlaid topography suggests that the observer device should not be able to see one of the basestations that was nonetheless reported as being observed. The topography might show a hill or other geographic feature, for example, that is obscuring the basestation. The addition of the spatial topography layer in this instance could be used to infer the existence of an error and/or to determine an appropriate location bias to produce a correction.

Regardless of the particular method by which a location bias is determined, the method may include storing and/or updating the location bias (step 130). For example, the location bias may be associated with the observer device condition and stored in a data store, such as location bias store 62 (FIG. 1). In some cases, a location bias or set of locations biases may be reported out for use at another location, such as at another processing module in a location determination system. Accordingly, method 120 may also include declaring a location bias or locations biases for the various observer device conditions, as shown at step 132. In the context of FIG. 1, for example, location biases may be provided to or retrieved by location engine 42 in order to improve the computations occurring at location engine 42.

Location biases may be computed for regions of varying spatial granularity. In some example embodiments, the accumulation of location biases over time can result in the location biases taking the form of a vector field, which may have two dimensions (latitude and longitude) or three dimensions (latitude longitude and elevation). In the two-dimensional example, a particular vector could be specified for a radius or other range around a given latitude and longitude. For example, a particular vector could be specified for each 10×10 meter square covering an urban area. Larger or smaller granularity may be employed (1×1 meter, 100×100 meter, etc.), as desired for a given application. Furthermore, very large areas or even the entire globe could be covered, over time, to specify location biases usable at different places to correct and improve location determination calculations. In addition, regardless of the particular form of the location biases or how they are determined, it will often be desirable to continuously accumulate and update location biases, to enhance the ability of the location determination system to improve a wide range of location determination calculations occurring under various circumstances and in various regions.

Figure 4:
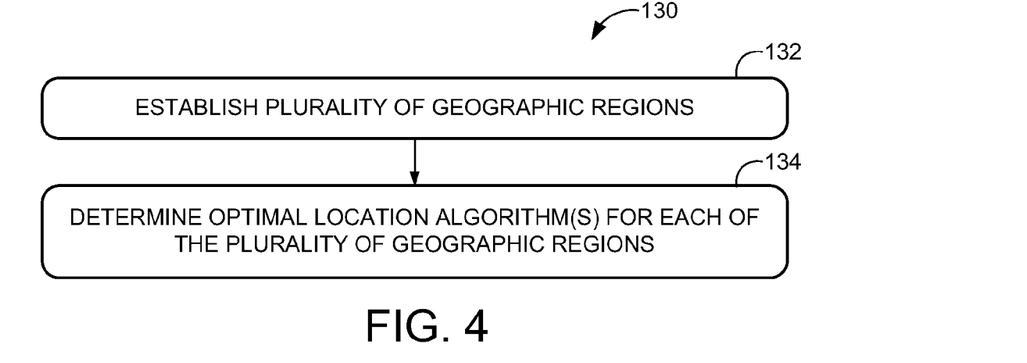
FIGS. 4 and 5 are flowcharts depicting example methods of determining optimal location algorithms on a geographic region basis.

In addition to or instead of determining a region-by-region location bias, the systems and methods herein may include determining an optimal location algorithm for each of a plurality of different regions. Then, based on the particular geographic region for which location determination is sought, the optimal algorithm can be used, for example by location engine 42 (FIG. 1). In general, as shown in FIG. 4 by exemplary method 130, an initial step may involve establishing a plurality of geographic regions (step 132). The geographic regions may be of any practicable size. In some example embodiments, a large area (e.g., a country) may be divided into types of regions (urban, rural, mountainous, etc.). The established geographic regions often will be larger in size than the regions discussed above with reference to determining and using specific location biases. For example, an optimal algorithm might be determined/selected for an entire city, with location biases being specified for smaller areas in the city, such as on a block-by-block basis or for 5×5 meter grid squares (or 5×5×5 meter cubes if elevation is employed). The geographic regions used for algorithm determination may, however, be similarly sized or smaller than the regions associated with determined location biases. In any case, method 130 may further include determining an optimal location algorithm or algorithms for each of the plurality of geographic regions, as shown at step 134.

Figure 5:
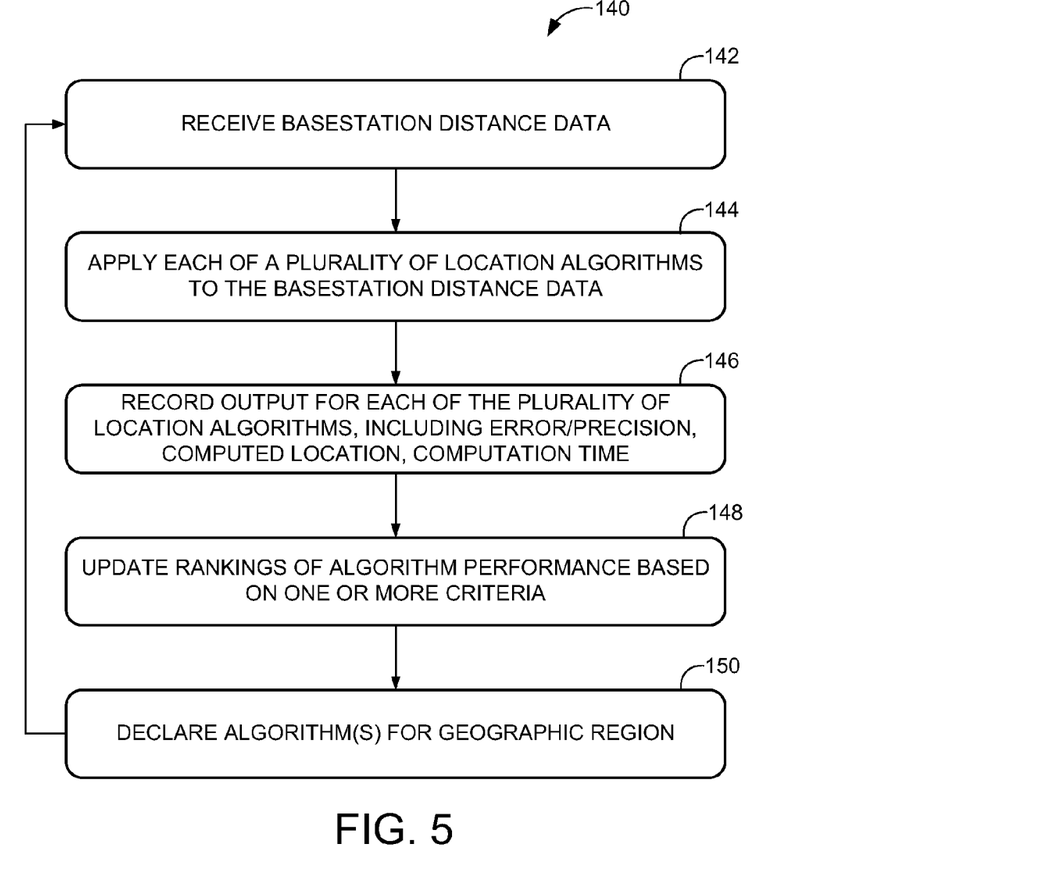

FIG. 5 depicts an example method 140 for determining optimal algorithms by geographic region. The method may be performed by algorithm analysis engine 50 in cooperation with one or more other components of FIG. 1, although other systems and components may be used. The depicted method is illustrated for one geographic region for simplicity of illustration and explanation. Typically, the example steps will be performed for each of a plurality of established geographic regions.

At step 142, method 140 includes receiving basestation distance data from an observer device. At step 144, each of a plurality of location algorithms are applied to the basestation distance data. The location algorithms typically are applied individually and/or in parallel to the basestation distance data, in order to evaluate and compare the performance of each algorithm, relative to the other algorithms being tested. The results of each calculation are recorded at step 146. Specifically, the output for each algorithm is recorded, which includes the computed location, the error/precision associated with the calculation, and the computation time of the calculation. These are but examples, and other aspects of the calculation may be noted and stored at step 146.

At step 148, the performance of each algorithm is assessed based on on one or more criteria. Rankings may also be employed in the performance assessment/comparison. For example, the tested algorithms may be ranked for their ability to provide accurate computed locations for the geographic region (relative precision). Additionally, or alternatively, the algorithms may be assessed/ranked based on the speed of computation (relative computation time). Thus, depending on the relative importance of speed and precision to a given calculation, a particular optimal algorithm could be selected for a given location computation. Also, as shown at step 150, the optimal algorithm or algorithms may be declared or reported out for use by other components. In FIG. 1, for example, the optimal algorithm or algorithms for a given region may be reported to or retrieved by location engine 42.

Typically, the various steps of FIG. 5 are performed repeatedly and dynamically in real time. As a result, the optimal region-specific algorithms may change over time, to reflect ever-improving and more current information about which algorithms are providing the best performance in each of the established geographic regions. Additionally, instead of evaluating individual algorithms, sequentially-applied algorithm chains may be tested and evaluated for each geographic region.

It will be appreciated that the present systems and methods may provide a feedback mechanism or mechanisms for tuning location determination. In addition to tuning operations applied to individual observer devices, the feedback can serve to improve various other aspects of the system. Feedback can be employed to verify and/or improve the quality of spatial layer data. Over time, locations of basestations or other participating entities may become known to greater degrees of precision based on the continuous analysis and processing provided by the feedback mechanism. The quantity and quality of reference observer data 34 (FIG. 1) may grow and become more reliable and refined over time. These are but a few examples.

Figure 6:
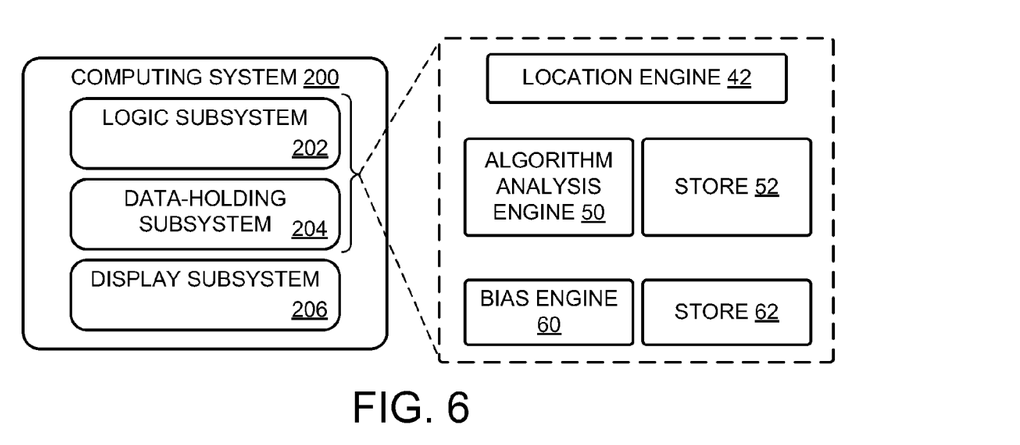
FIG. 6 schematically depicts an exemplary computing system for implementing the location-determining systems and methods of the present description.

The described systems and methods may be tied to a computing system, such as exemplary computing system 200 of FIG. 6. As indicated, the computing system may include a logic subsystem 202 and a data-holding subsystem 204. The logic subsystem and/or data-holding subsystem may be configured to carry out or otherwise implement the various methods and system components described above. For example, as shown, the logic subsystem and/or data-holding subsystem may be used to implement one or more of location engine 42, algorithm analysis engine 50 and its related store 52, and bias engine 60 and its related store 62. In particular, data-holding subsystem 204 may store application programs, routines or other instructions to perform one or more of the functions of these components, and/or carry out the exemplary methods described with reference to FIGS. 2-5.

Logic subsystem 202 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

When included, the data-holding subsystem 204 may include one or more physical devices configured to hold data and/or instructions executable by the logic subsystem to implement the herein described methods and processes. When such methods and processes are implemented, the state of the data-holding subsystem may be transformed (e.g., to hold different data). The data-holding subsystem may include removable media and/or built-in devices. The data-holding subsystem may include optical memory devices, semiconductor memory devices, and/or magnetic memory devices, among others. The data-holding subsystem may include devices with one or more of the following characteristics: volatile, nonvolatile, dynamic, static, read/write, read-only, random access, sequential access, location addressable, file addressable, and content addressable. In some embodiments, the logic subsystem and data-holding subsystem may be integrated into one or more common devices, such as an application specific integrated circuit or a system on a chip.

Computing system may further include a display subsystem 206, for example at an administrator workstation used to configure or otherwise manage operation of system 20 (FIG. 1). When included, a display subsystem such as subsystem 206 may be used to present a visual representation of data held by a data-holding subsystem. As the herein described methods and processes change the data held by the data-holding subsystem, and thus transform the state of the data-holding subsystem, the state of the display subsystem may likewise be transformed to visually represent changes in the underlying data. The display subsystem may include one or more display devices utilizing virtually any type of technology. Such display devices may be combined with a logic subsystem and/or a data-holding subsystem in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for determining location of an observer device, comprising:
receiving basestation distance data for the observer device, the basestation distance data including identification of one or more basestations and information indicating a distance between the observer device and each of the one or more basestations;
applying a location algorithm to the basestation distance data to calculate a computed location of the observer device;
determining whether the basestation distance data correlates to any of a plurality of observer device conditions; and
if the basestation distance data correlates with one of the plurality of observer device conditions, correcting the computed location with a location bias that is associated with said one of the plurality of observer device conditions, in order to provide a corrected location of the observer device.

2. The method of claim 1, where the location bias is a vector.

3. The method of claim 1, where the location bias depends at least in part upon spatial layer data.

4. The method of claim 3, where the spatial layer data includes weather data which is contemporaneous with the basestation distance data.

5. The method of claim 3, where the spatial layer data includes map data specifying locations of streets and buildings in a vicinity of the computed location of the observer device.

6. The method of claim 5, where the location bias is generated such that the corrected location of the observer device is co-located with a building or a street included in the map data.

7. The method of claim 3, where the spatial layer data includes map data specifying topography in a vicinity of the computed location of the observer device.

8. The method of claim 1, further comprising:
establishing a plurality of geographic regions; and
selecting, for each of the plurality of geographic regions, an optimal location algorithm from a plurality of location algorithms.

9. The method of claim 8, further comprising determining whether the basestation distance data correlates to any of the plurality of geographic regions, and where applying the location algorithm to the basestation distance data includes applying the optimal location algorithm for one of the plurality of geographic regions if it is determined that the basestation distance data correlates to said one of the plurality of geographic regions.

10. The method of claim 8, where selecting an optimal location algorithm for each of the plurality of geographic regions is based on comparing relative performance, for geographic region, of the plurality of location algorithms.

11. The method of claim 10, where comparing relative performance includes comparing relative computation time of the plurality of location algorithms.

12. The method of claim 10, where comparing relative performance includes comparing relative precision of the plurality of location algorithms.

13. A method of determining location of an observer device, comprising:
establishing a plurality of geographic regions;
comparing, for each of the plurality of geographic regions, relative performance of a plurality of location algorithms in order to determine an optimal location algorithm for each of the plurality of geographic regions;
receiving basestation distance data for the observer device;
determining whether the basestation distance data correlates to any of the plurality of geographic regions; and
if the basestation distance data correlates to one of the plurality of geographic regions, applying the optimal location algorithm for that one of the plurality of geographic regions to the basestation distance data to determine a computed location for the observer device.

14. The method of claim 13, where comparing relative performance includes comparing relative precision of the plurality of location algorithms.

15. The method of claim 13, where comparing relative performance includes comparing relative computation time of the plurality of location algorithms.

16. The method of claim 13, where comparing relative performance of the plurality of location algorithms is performed repeatedly over time to dynamically update the optimal location algorithm that is associated with each of the plurality of geographic regions.

17. A computing system for determining location of an observer device, comprising:
a logic subsystem; and
a data-holding subsystem including instructions executable by the logic subsystem to:

process basestation distance data received for the observer device to determine whether the basestation distance data correlates to any of a plurality of geographic regions;

select an optimal location algorithm associated with one of the plurality of geographic regions if it is determined that the basestation distance data correlates to said one of the plurality of geographic regions;

apply the optimal location algorithm to the basestation distance data to obtain a computed location of the observer device;

determine whether the basestation distance data correlates to any of a plurality of observer device conditions;

select a location bias associated with one of the plurality of observer device conditions if it is determined that the basestation distance data correlates to said one of the plurality of observer device conditions; and correct the computed location of the observer device with the location bias to obtain a corrected location of the observer device.

18. The computing system of claim 17, where the location bias is a vector generated based on spatial layer data.

19. The computing system of claim 17, where the instructions are further executable to assemble and repeatedly update, over time, a store of observer device conditions and associated location biases that are usable to adjust output of location algorithms applied to basestation distance data.

20. The computing system of claim 17, where the instructions are further executable to repeatedly update, over time, a store identifying geographic regions and associated optimal location algorithms that are usable to calculate locations of observer devices in the geographic regions.

* * * * *